Jan. 4, 1955

A. C. TURNER 2,698,738

REAMER FOR BOREHOLES FOR OIL WELLS

Filed Sept. 2, 1953

Albert C. Turner
INVENTOR.

BY Cecil L. Wood

ATTORNEY

United States Patent Office 2,698,738
Patented Jan. 4, 1955

2,698,738

REAMER FOR BOREHOLES FOR OIL WELLS

Albert C. Turner, Fort Worth, Tex., assignor to Turner Bits, Inc., Fort Worth, Tex.

Application September 2, 1953, Serial No. 378,107

8 Claims. (Cl. 255—73)

This invention relates to drilling apparatus for deep wells, and it has particular reference to bore-hole reamers of the type adapted to be connected in a drilling string above the bit and having a plurality of fluted reamer rollers mounted therein and rotating on shafts arranged in vertical planes, and the principal object of the invention resides in a novel manner of securely mounting the shafts, with their rotary reamers, by which these members can be removed for replacement or repair with a minimum of difficulty while affording a device by which the parts can be positively secured against becoming dislodged in the bore-hole to cause damage to the equipment and result in expensive shutdowns and fishing operations.

A further object of the invention is that of providing a reamer construction which will enable its being economically produced and assembled, obviating the necessity for welding the parts in position to secure the same against involuntary dislodgement, and providing a structure requiring a minimum of machining in preparation for the installation of the rotating reamer elements, and their shafts, and for providing the essential securing devices therefor.

An object of the invention resides in the provision of a reamer tool of the character described which has no irregular surfaces presented to the walls of a bore hole, such as indentations or recesses capable of becoming clogged or lodging upon projected formation in the bore hole, whereby to fowl the operation thereof and deter the same, and whereby the body of the reamer can be free from the accumulation of cuttings, and other matter, in the surfaces where open recesses and grooves are presented to the walls of the bore hole.

A still further object of the invention is provided in the flexibility of the invention in that the parts are self-aligning, but incapable of displacement in operation while adapted to limited movement to avoid strains and stresses which tend to gall or bind the pivotal movement of the rotary cutters or the shafts upon which these members are operated.

Broadly, the invention contemplates the provision of a unique construction and arrangement of parts by which the reamer rollers, which are designed to bear against the bore-hole walls in the wake of the bit, are capable of free action in their mountings without working loose to damage or impair the bearings and create a hazard to the drilling operations, and by which the jars and shocks to which the rollers are subjected in operation are not transmitted directly to the other parts of the device.

While the foregoing objects are paramount, other and lesser objects will become manifest as the description proceeds, taken in connection with the appended drawings wherein.

Figure 1:
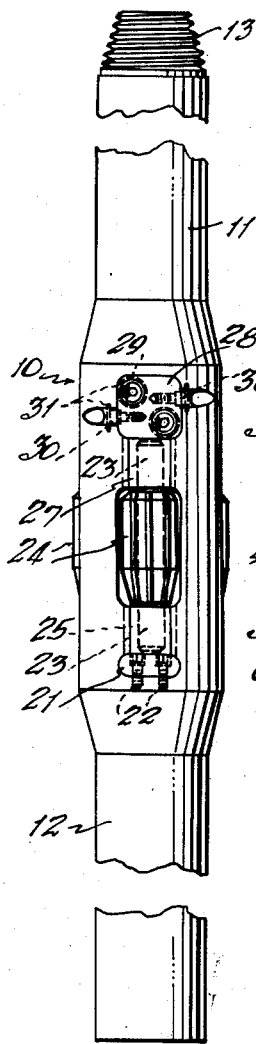
Figure 1 is a side elevational view of the invention showing one of the reamer rollers, and illustrating the arrangement of the wear plates and bearing securing block.

Accordingly, the invention includes a cylindrically formed body 10 having portions 11 and 12 on each end whose diameters are reduced. The upper portion 11 has a threaded tapered pin 13 thereon which opposes a tapered box 14 on the lower end by which the device can be connected into a conventional drill string (not shown). A water course 15 is formed axially through the body 10 and is shown in dotted lines in Figure 2.

Figure 5:
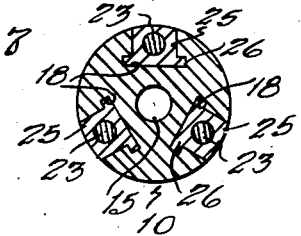
Figure 5 is another transverse sectional view, on lines 5—5 of Figure 2, showing the T-slots or grooves for the flanged bearings for the roller shafts.

Formed about the body 10, and equidistantly spaced, are a plurality of cavities 16 whose greater dimensions are longitudinally of the body 10. Spaced below each cavity 16 is a recess 17, shown in detail in Figure 2, and connecting the latter with the cavities 16 are T-grooves or T-slots 18, more particularly illustrated in Figure 5, and spaced above the cavities 16 are larger recesses 19 which are connected to the upper ends of the cavities 16 by T-slots 20. The form of the recesses 19 is shown in Figure 3.

Figure 2:
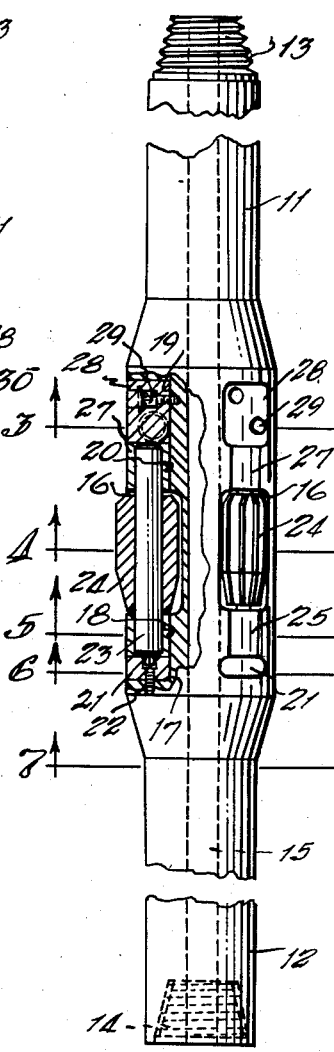
Figure 2 is another elevational view of the invention, showing a portion cut away to illustrate the reamer roller, the bearings and the devices for securing the same.
Figure 3:
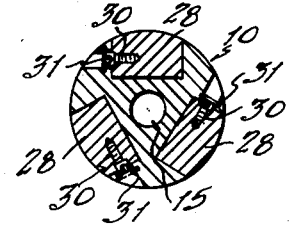
Figure 3 is a transverse sectional view, on lines 3—3 of Figure 2, showing the bearing securing blocks and the arrangement of studs therein.
Figure 4:
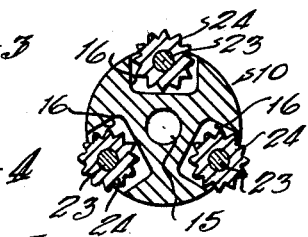
Figure 4 is a transverse sectional view, on lines 4—4 of Figure 2, illustrating the reamer rollers on their shafts in spaced cavities therefor.
Figure 6:
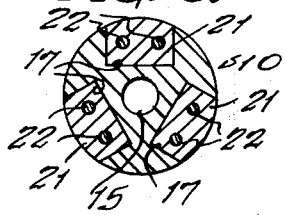
Figure 6 illustrates, in transverse section, on lines 6—6 of Figure 2, the wear plates for the lower ends of the shafts and illustrating the securing studs.
Figure 7:
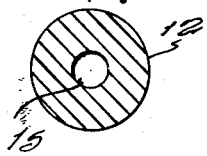
Figure 7 is a transverse sectional view through lower portion of the body, on lines 7—7 of Figure 2.

Seated in each of the lower recesses 17 is a wear block or plate 21 which is secured by studs 22 which are threaded into the body 10 in the bottoms of the recesses 17, as shown in Figures 1 and 2. The members 21 are shown in lateral cross-section in Figure 6. The wear plates 21 support the vertical shafts 23 of the fluted reamer rollers 24, and are of hardened material capable of resisting the wear which may be occasioned by the rotation of the shafts 23 in abrasive formation materials. This arrangement is shown in Figure 2, in dotted lines in Figure 1, and in lateral section in Figure 4. The shafts 23 are journalled, at their lower ends, in bearings 25 which are formed with longitudinal flanges 26 corresponding to the opposing channels of the T-slots 18 in which the bearings 25 are slidably supported.

Similar bearings 27 are arranged in the T-slots 20 above the cavities 16 in which the upper ends of the shafts 23 are journalled. Retainer blocks 28 are secured in the uppermost recesses 19, at the upper ends of the T-slots 20, by studs 29 through the outer faces of the blocks 28 and into the backs of the recesses 19, as shown in Figures 1 and 2, and by additional studs 30 inserted tangentially through the body 10 at each side of and into the blocks 28, as shown in Figure 3. Each of the studs 29 and 30 are provided with suitable locking devices such as expansion rings 31 which extend into circular grooves formed about the stud sockets.

The parts are assembled by first installing the wear plates 21 in their recesses 17 and inserting and tightening the studs 22 therein. The rollers 24 having been arranged on the shafts 23, and the lower bearings 25 being arranged in the T-slots 18, the lower ends of the shafts 23 can be inserted into the lower bearings 25 and the rollers 24 will assume their operative positions in the recesses 16.

The upper bearings 27 are inserted into the upper T-slots 20, over the upper ends of the shafts 23, whereupon the assemblies are locked in position by the securing or retainer blocks 28 which are installed in the upper recesses 19, above the upper ends of the shafts 23 and the bearings 27, and secured by the studs 29 and 30. Thus, it is apparent that the device may be easily and quickly assembled, and due to the simplicity of design, the machining operations in forming the recesses 17 and 19, and the T-slots 18 and 20 can be accomplished economically. It is also apparent that, due to the fact that none of the frictional parts are rigidly secured to the body, there is a limited amount of flexibility which will avoid binding or galling of the shafts or the rotors, and a smooth outer surface of the invention is always presented to the walls of the bore hole. Moreover, there is a minimum of hazard in any of the parts becoming loosened or detached to cause damage to the drilled well.

Manifestly, the structure herein shown and described is capable of certain changes and modifications from time to time, by persons skilled in the art, without departing from the spirit and intent of the invention, or the scope of the appended claims.

What is claimed is:

1. In a reamer construction for oil well drill stems comprising, in combination with a body having box and pin coupling means on its respective ends, a plurality of circumferentially spaced cavities formed longitudinally of said body, a recess above and below each of said cavities and having connecting T-slots therewith, a wear plate secured in and filling each of the lower recesses, bearings slidably mounted in each of said T-slots at each end of said cavities having their outer faces flush with the surface of said body, a shaft pivoted in each of said bearings and supported on said wear plates and having a reamer roller freely rotative thereon in each cavity, and bearing retainer blocks secured in and closing the uppermost of said recesses and having their outer surfaces flush with the exterior surface of said body.

2. In a reamer adapted for connection in a drill stem, having a body and a plurality of reamer rollers in cavities spaced circumferentially, thereof, a mounting device for said reamers comprising a recess formed in said body below each of said cavities and a wear plate secured therein and filling the same to present its outer surface flush with the surface of said body, a rectangular recess in the upper portion of said body above each of said cavities, a T-slot providing communication between each of said upper and lower recesses and said cavities, flanged bearing members slidably arranged in each of said T-slots, shafts for said reamers journalled for free rotation at their ends in said bearings and supported on said wear plates, and a bearing retainer block secured in each of said upper recesses and closing the same to present a common plane surface for said body and said bearings, wear plates and said retainer blocks to the walls of a bore hole.

3. In a device for securing reamer shaft bearings in bore-hole reamers for oil wells, in combination with a body adapted for connection in a drill string, a plurality of elongated cavities spaced circumferentially about said body, each having a shaft and a reamer roller freely rotative thereon operating therein, a T-shaped groove formed longitudinally of said body at each end of each of said cavities and communicating therewith, a bearing slidably supported in each of said T-shaped grooves and providing journals for said shafts, a wear plate secured flush with the surface of said body at the lower end of each of the grooves at the lower ends of said cavities and having its outer surface in a common plane with the surface of said body, and a bearing retainer block secured on said body across the upper end of each of the grooves above said cavities whereby its outer surface conforms to that of said body.

4. In a reamer for bore holes having means for connecting the same into a drill string, a cylindrical body formed with a plurality of cavities equidistantly spaced circumferentially thereof, a shaft in each of said cavities, a reamer roller freely mounted on said shaft in each of said cavities and rotative in planes parallel to the axis of said body, T-slots formed with each end of said cavities and extending longitudinally of said body, flanged bearings slidably arranged in each of said T-slots for said shafts and having their outer surfaces conformable to the plane surface of said body, a recess formed at the upper end of each of the uppermost of said T-slots, and securing blocks for said bearings in each of said recesses having their external surfaces in the same plane with that of said body.

5. In a device for mounting reamer rollers in a bore-hole reamer for oil wells, in combination with reamer body adapted for connection in a drill string, a plurality of equidistantly spaced cavities formed longitudinally of said body, each having a T-slot formed axially thereof at each end, a recess formed at the lower end of each of the lowermost of said T-slots and a wear plate secured in each of said recesses to fill the same conformably with the plane surface of said body, a flanged bearing block slidably arranged in each of said T-slots above and below said cavities and having their exposed surfaces flush with that of said body, a shaft in each of said cavities and journalled at each end in said bearing blocks and supported on said wear plates and having a reamer roller freely rotative thereon, and a bearing retainer block secured in said body at the upper end of each of the uppermost T-slots and having its outer surface in a common plane with that of said body.

6. In a supporting device for reamer roller shafts in a bore-hole reamer having a substantially cylindrical body and means for connecting the same into a drill string, the combination comprising a plurality of cavities spaced about the said body and extending longitudinally thereof, a reamer roller freely rotative on a shaft in each of said cavities, a T-slot formed at each end of each of said cavities, each having a bearing slidably arranged therein having its exposed surface flush with that of said body and providing journals for the ends of said shafts, and a removable block rigidly secured at the outer end of each of the uppermost of said T-slots retaining said bearings therein and presenting their outer surfaces in a plane common to the surface of said body.

7. In a reamer for bore holes adapted to be connected in a drill stem, in combination with a cylindrical body formed with a plurality of longitudinal cavities, a T-shaped groove at each end of each cavity and a recess formed at the upper end of the uppermost grooves, and at the lowermost end of said lowermost grooves, respectively, a wear plate secured in each of the lowermost recesses, a bearing slidably arranged in and conformable to each of said T-shaped grooves, and a retainer block secured in each of the said uppermost recesses with the exposed surfaces of said wear plates, said bearings and said retainer blocks in the same plane with the surface of said body, and a shaft journalled in each set of said bearings and having a reamer roller rotatively mounted thereon in each of said cavities, the lower ends of said shafts being supported on said wear plates.

8. A reamer for oil wells having a cylindrical body and a plurality of rotary cutters rotatively supported in said body, a mounting structure for said rotary cutters comprising cavities formed in said body and equidistantly spaced thereabout, a T-shaped groove formed at each end of each of said cavities and a recess formed at the uppermost ends of the uppermost grooves and at the lowermost ends of the lowermost of said grooves, a wear plate secured in each of the lowermost of said recesses, a bearing slidably arranged in each of said T-shaped grooves, a shaft in each cavity having its ends journalled in each set of said bearings and supported on each of said wear plates, a fluted cutter member rotatably supported on each of said shafts in said cavities and a retainer block for said bearings rigidly secured in each of said uppermost recesses.

References Cited in the file of this patent

UNITED STATES PATENTS

| | | |
|---|---|---|
| 1,999,132 | Reed | Apr. 23, 1935 |
| 2,122,763 | Smith, Jr. | July 5, 1938 |
| 2,189,031 | Harrington | Feb. 6, 1940 |